Patented May 27, 1924.

1,495,538

UNITED STATES PATENT OFFICE.

KARL B. THEWS, OF DENVER, COLORADO, ASSIGNOR TO WILLIAM A. J. BELL, OF DENVER, COLORADO.

ART OF EXTRACTING VALUES FROM RARE METAL ORES.

No Drawing. Application filed July 12, 1921. Serial No. 484,197.

*To all whom it may concern:*

Be it known that I, KARL B. THEWS, a German citizen, and resident of Denver, in the county of Denver and State of Colorado, have invented certain new and useful Improvements in the Art of Extracting Values from Rare Metal Ores, of which the following is a specification.

The present invention relates to the extraction of metallic values from rare ores such as contain vanadium, radium, uranium or any of them and is intended to provide a more economical and complete method of recovering such metallic values than is practicable under processes heretofore commercially used for such extraction.

In my earlier application for U. S. Patent Serial No. 468,359 I have already explained the considerations and conditions affecting the commercial extraction of these rare metal values. The present invention constitutes a further extension or supplementary application of the principles pertaining to this art discovered by me and disclosed in said application.

In that former specification I suggested that the successful results of that process in the way of economical and direct extraction from the ground and diluted body of ore was due to the reducing action effected by the modes of treatment therein described. Further tests and experiments have tended very strongly to confirm the theory therein announced and have led to extending more widely the range of substances or re-agents available for effecting the desired results.

Whether or not the theory suggested that the more rapid, efficient and economical extraction of the metallic values from these rare ores by a reducing bath is the true explanation of the nature of the action that takes place, it is certain in practice that the most efficient results are obtained by the use of substances that are known to have a reducing action or quality, and it is this feature or characteristic that lies at the basis of my discovery and of its application to this art.

In that application I disclosed the practicability of using an extraction reagent having the two-fold action or quality of a reducing agent and of a solvent such as an organic acid, for example, oxalic acid ($C_2H_2O_4$). I also disclosed therein a process involving the use of two reagents one of which had a reducing quality, such as oxalic acid, and the other of which hydrochloric acid (HCl) functioned as an acid solvent.

The present invention involves a further extension of this principle based upon the discovery that substances having a capability of reducing action that are not themselves acid solvents may be used in connection with an acid solvent that is not necessarily a reducing agent to effect the quick and economical extraction of the rare metal values from their ores.

It will be understood that the term "ore" as used in this specification and claims is intended to include not only raw ore before it has been subjected to any processing other than grinding and diluting, but also any secondary or derivative forms into which the metalliferous material may be converted either by mechanical or chemical processes, whether in the form of concentrates, tailings, slimes or chemical compounds so long as they contain commercially recoverable metallic value. Furthermore, this process is intended to deal with all kinds of metalliferous material containing vanadium, radium, uranium, such for example, as carnotite or any of these values such as roscoelite which contains vanadium without appreciable quantities of the other values above mentioned.

The present invention, therefore, is based primarily upon treating the ore body in the bath with a substance that is capable of a reducing action on the ore and either simultaneously or subsequently mingling an acid solvent with the diluted ore which acid solvent may be either of the organic or of the inorganic class. Hence the present process may be practiced in a number of ways and with a wide range of materials for selection some of which, for the purpose of specific illustration, will now be explained in detail.

After the ore body has been ground or comminuted to a fineness approximately of from 20 to 40 mesh, it is mixed with, say two or three times its weight of water, to give it the desired degree of fluidity and the ore-containing body is then preferably heated to the boiling point and agitated or stirred to keep the ore from settling.

Into this ore bath, preferably heated and agitated, I then conduct a stream of hydrogen gas which becomes well mingled with the agitated mass of the comminuted ore adding at the same time a quantity of the acid solvent. This acid solvent could, of course, be some organic acid, such as oxalic acid, but as the hydrogen present supplies the requisite reducing agent an inorganic acid such as hydrochloric acid (HCl) can be just as advantageously used and will, generally, be cheaper for the purpose on account of its lower cost. No exact amount of the acid is prescribed but ordinarily in the treatment of an average run of carnotite ore I would use a weight of HCl approximately ten fold the weight of the uranium oxide present in the ore being treated. It would probably be more convenient to add the acid solvent first and then while agitating the ore bath to thoroughly mix the acid therewith, to introduce the hydrogen into the bath. This treatment ordinarily will not require more than about 30 minutes after which the gangue or silicious mass may be allowed to settle. The liquid solution containing the metallic values chiefly as vanadium, uranium, radium barium chlorides, if HCl be used, would then be drawn off or mechanically separated either by filtration, decantation or otherwise leaving the tailings substantially devoid of the sought for values.

Assuming that the so-called reducing agent does actually have a reducing action upon the ore, it will be seen that it would be possible to carry on the mixing of the reducing agent first and thereafter mixing with the bath so treated the necessary amount of the acid solvent to put the desired values into solution, but although the process may be practiced in this manner on the whole it would seem to be generally more advantageous to treat the ore bath with both the reducing agent and the acid solvent at the same operation.

While I have mentioned hydrogen as a reducing agent available for this purpose which is not an acid solvent, it will be understood that there are a great many of such reducing agents known to metallurgists beside hydrogen. The mention of a few of these such as carbon monoxide, methyl alcohol, formaldehyde, acetaldehyde, ethylene, grape sugar or dextrose, cane sugar and benzaldehyde, will be sufficient.

It will also be clear, upon further consideration, that the required reducing agent may be supplied indirectly by means of a substance that, while not in itself a reducing agent, will act to liberate or evolve a reducing agent in the bath.

For example, if metallic zinc, preferably in powder form, should be mingled with the acid bath the zinc would combine with the chlorine of the acid and thus hydrogen would be liberated as a reducing agent. In such case, however, sufficient acid should be introduced to combine with the zinc as well as to perform its function as a solvent of the metallic values sought for.

It will, therefore, be seen that the desired action may be obtained either by the direct introduction into the ore bath of the reducing agent or indirectly by the evolution or production of a reducing agent in the bath due to some chemical reaction caused by the introduction of some substance or material by means of which the reducing agent may be produced.

The chief characteristic that differentiates the present application from my earlier filed application mentioned, resides in the specific inclusion of substances available for use in the process that are not of an acid solvent nature while still possessing a reducing property or quality thereby greatly extending the range of materials available for the process.

What I claim is:

1. The improvement in the art of extracting the values from ores containing vanadium uranium and radium or any of them, which consists in treating the comminuted and diluted ore body with a non-solvent reagent possessing reducing properties and also with an acid solvent for the purpose of putting the sought for values into solution whereby they may be effectively separated from the gangue for recovery, substantially as described.

2. The improvement in the art of extracting the values from carnotite or other radium bearing ores which consists in subjecting the metalliferous ore body to treatment with an element possessing ore reducing properties and simultaneously mingling with the ore body an acid solvent whereby the contained values are put into solution capable of mechanical separation from the gangue, substantially as described.

3. The improvement in the art of extracting the values from vanadium and radium bearing ores, such as carnotite which consists in treating the ore body with hydrogen and mingling with the ore so treated a relatively small proportion of an acid solvent in order to put the sought for values into a solution capable of mechanical separation from the gangue, substantially as described.

4. The improvement in the art of extracting the values from vanadium or radium bearing ores such as carnotite which consists in heating a comminuted and diluted body of ore, and mingling therewith while in heated condition a non-solvent hydrogen-containing reducing agent, and an acid solvent reagent for a sufficient period to dissolve substantially all the sought for values, substantially as described.

5. The improvement in the art of extracting rare metals for carnotite or other vanadium or radium bearing ores which consists in mixing with a comminuted and diluted body of the ore a relatively small quantity of hydrochloric acid in the presence of a non-solvent reducing agent, and thereby putting the sought for values into solution for the purpose of separating the values from the gangue, substantially as described.

In witness whereof, I have subscribed the above specification.

KARL B. THEWS.